United States Patent Office 3,558,523
Patented Jan. 26, 1971

3,558,523
HYDROCARBON ISOMERIZATION CATALYST
Richard E. Rausch, Mundelein, Ill., assignor to Universal Oil Products Company, Des Plaines, Ill., a corporation of Delaware
No Drawing. Continuation-in-part of application Ser. No. 819,114, Apr. 24, 1969. This application June 16, 1969, Ser. No. 833,786
Int. Cl. B01j 11/74
U.S. Cl. 252—439                              5 Claims

ABSTRACT OF THE DISCLOSURE

Isomerizable hydrocarbons are isomerized using a catalytic composite comprising a combination of a platinum group component, a tin component, and a rhenium component with a porous carrier material. A catalytic composite comprising a platinum group component, a tin component, a rhenium component, and a Friedel-Crafts metal halide component combined with a refractory inorganic oxide is also disclosed.

CROSS-REFERENCES TO RELATED APPLICATIONS

This application is a continuation-in-part of my copending application Ser. No. 819,114, filed Apr. 24, 1969, the teachings of which are specifically incorporated herein.

BACKGROUND OF THE INVENTION

This invention relates to a process for isomerizing isomerizable hydrocarbons including isomerizable paraffins, cycloparaffins, olefins, and alkylaromatics. More particularly, this invention relates to a process for isomerizing isomerizable hydrocarbons with a catalytic composite comprising a combination of a platinum group component, a tin component, ad a rhenium component with a porous carrier material. More precisely, the present invention involves a dual-function catalytic composite having both a hydrogenation-dehydrogenation function and a cracking function which enables substantial improvements in hydrocarbon isomerization processes that have traditionally used dual-fuction catalysts.

Isomerization processes for the isomerization of hydrocarbons have acquired significant importance within the petroleum and petrochemical and petroleum refining industry. The demand for the various xylene isomers, particularly paraxylene, has resulted in a need for processes for isomerizing other xylene isomers and ethylbenzene to produce paraxylene. Also, the need for branched chain paraffins, such as isobutane or isopentane as intermediates for the production of high octane motor fuel alkylate can be met by isomerizing the corresponding normal paraffins. In addition, in motor fuel produced by paraffin-olefin alkylation, it is desired that the final alkylate be highly branched to insure a high octane rating. This can be accomplished by alkylating isobutane or isopentane with a $C_4$–$C_7$ internal olefin which, in turn, can be produced by isomerization of the corresponding linear alpha-olefin and shifting the double bond to a more central position.

Catalytic composites exhibiting a dual hydrogenation-dehydrogenation function and a cracking function are widely used in the petroleum and petrochemical industry to isomerize isomerizable hydrocarbons. These catalysts are generally characterized as hiving a heavy metal component, such as metals or metallic compounds of Group V through VIII of the Periodic Table to impart a hydrogenation-dehydrogenation function when associated with an acid-acting, adsorptive, refractory inorganic oxide which imparts a cracking function. In these isomerization reations it is important that the catalytic composite not only catalyze the specific isomerization reaction involved by having its dual hydrogenation-dehydrogenation function correctly balanced against its cracking function, but, further, that the catalyst also be able to perform its desired functions equally well over prolonged periods of time.

The performance of a given catalyst in a hydrocarbon isomerization process is typically measured by the activity, selectivity, and stability of the catalyst wherein activity refers to its ability to isomerize the hydrocarbon reactants into the corresponding isomers at a specified set of reaction conditions; selectivity refers to the percent reactants isomerized to form the desired isomerized product and/or products; and stability refers to the rate of change of the selectivity and activity of the catalyst.

The principal cause of instability (i.e., loss of selectivity in an original, selective, active catalyst) is the formation of coke on the catalytic surface of the catalyst during the course of the reaction; this coke being charaterized as a high molecular weight hydrogen-deficient carbonaceous material, typically having an atomic carbon to hydrogen ratio of about 1 or more. Accordingly, a major problem in the hydrocarbon isomerization art is the development of more active and selective composites that are not as sensitive to the presence of the foregoing carbonaceous materials and/or have the ability to suppress the rate of the formation of these carbonaceous materials on the catalyst. A primary aim of the art is to develop a hydrocarbon isomerization process utilizing a dual-function catalyst having superior activity, selectivity, and stability. In particular, it is desired to have a hydrocarbon isomerization process wherein the isomerizable hydrocarbons are isomerized without excessive cracking or other decomposition reactions occurring which lower the overall yield of the process and make it more difficult to operate.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst effective in isomerizing isomerizable hydrocarbons without introducing undesired decomposition and/or cracking reactions. It is a further object of this invention to provide a process for isomerizing isomerizable hydrocarbons utilizing a dual-function catalyst having superior activity, selectivity, and stability.

An isomerization process has now been developed utilizing a dual-function catalyst which possesses improved activity, selectivity, and stability. Moreover, in the particular case of a $C_8$ alkylaromatic isomerization process, this catalyst produces essentially equilibrium conversions of the $C_8$ alkylaromatics with essentially stoichiometric selectivity without evidencing excessive production of hydrogenated or cracked products. Further, this activity and selectivity is readily maintainable at its originally high levels, thus yielding a very stable catalytic alkylaromatic isomerization process. This catalyst utilizes rhenium and tin to promote a platinum metal component when utilized with an acid-acting porous carrier material such as alumina.

In a broad embodiment, this invention relates to a process for isomerizing an isomerizable hydrocarbon which comprises contacting said hydrocarbon at isomerization conditions with a catalytic composite comprising a combination of a platinum group component, a tin component, and a rhenium component with a porous carrier material.

In a more limited embodiment, this invention relates to an isomerization process utilizing a catalytic composite comprising a combination of a platinum component, a tin component, a rhenium component, and a halogen component with an alumina carrier material. These components are preferably present in the composite in amounts sufficient to result in the final composite containing, on an elemental basis, about 0.1 to about 5.0 wt. percent halogen, about 0.01 to about 1.0 wt. percent platinum, about 0.01 to about 5.0 wt. percent tin, and about 0.01 to about 1.0 wt. percent rhenium.

In a more specific embodiment, this invention relates to the isomerization of either saturated or olefinic isomerizable hydrocarbons by contacting either hydrocarbon with the aforementioned catalytic composites at isomerization conditions which include a temperature of about 0° C. to about 425° C., a pressure of about atmospheric to about 100 atmospheres and a liquid hourly space velocity of about 0.1 to about 10. In another limited embodiment this process relates to the isomerization of an isomerizable alkylaromatic hydrocarbon by contacting the alkylaromatic with the aforementioned catalytic composites at isomerization conditions which include a temperature of about 0° C. to about 600° C., a pressure of about atmospheric to about 100 atmospheres, a liquid hourly space velocity of about 0.1 to about 20.0 hr.$^{-1}$ and a hydrogen to hydrocarbon mole ratio of about 1:1 to about 20:1.

In another embodiment, this invention relates to a catalytic composite which comprises a refractory inorganic oxide having combined therewith a platinum group metallic component, a tin component, a rhenium component and a Friedel-Crafts metal halide component.

Other objects and embodiments referring to alternative isomerizable hydrocarbons and to alternative catalytic compositions will be found in the following further detailed description of this invention.

DESCRIPTION OF PREFERRED EMBODIMENTS

The process of this invention is applicable to the isomerization of isomerizable saturated hydrocarbons including acyclic paraffins and cyclic naphthenes and is particularly suitable for the isomerization of straight chain or mildly branched chain paraffins containing 4 or more carbon atoms per molecule such as normal butane, normal pentane, normal hexane, normal heptane, normal octane, etc. and mixtures thereof. Cycloparaffins applicable are those ordinarily containing at least 5 carbon atoms in the ring such as alkylcyclopentanes and cyclohexanes, including methylcyclopentane, dimethylcyclopentane, cyclohexane, methylcyclohexane, dimethylcyclohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, hexane fractions, and mixtures thereof. It is not intended, however, to limit this invention to these enumerated saturated hydrocarbons and it is contemplated that straight or branched chain saturated hydrocarbon containing up to about 20 carbon atoms per molecule may be isomerized according to the process of the present invention with $C_4$–$C_9$ hydrocarbons being particularly preferred.

The olefins applicable within this isomerization process are generally a mixture of olefinic hydrocarbons of approximately the same molecular weight, including the 1-isomer, 2-isomer, and other position isomers, capable of undergoing isomerization to an olefin in which the double bond occupies a more centrally located position in the hydrocarbon chain. The process of this invention can be used to provide an olefinic feedstock for motor fuel alkylation purposes containing an optimum amount of the more centrally located double bond isomers, by converting the 1-isomer, or other near terminal position isomer into olefins wherein the double bond is more centrally located in the carbon atoms chain. The process of this invention is also applicable to the isomerization of such isomerizable olefinic hydrocarbons such as the isomerization of 1-butene to 2-butene or the isomerization of the 3-methyl-1-butene to 2-methyl-2-butene. Also, the process of this invention can be utilized to shift the double bond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. Particularly preferred are the $C_4$–$C_7$ isomerizable olefins. The process of this invention also applies to the hydroisomerization of olefins wherein olefins are converted to branched-chain paraffins and/or branched olefins.

Further, the process of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc. and mixtures thereof. Preferred isomerizable alkylaromatic hydrocarbons are the monocyclic alkylaromatic hydrocarbons, that is, the alkylbenzene hydrocarbons, particularly the $C_8$ alkylbenzene and nonequilibrium mixtures of the various $C_8$ aromatic isomers. Higher molecular weight alkylaromatic hydrocarbons such as the alkylnaphthalenes, the alkylanthracenes, the alkylphenanthrenes, etc., are also suitable.

These foregoing isomerizable hydrocarbons may be derived as selective fractions from various naturally occurring petroleum streams either as individual components or as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus, the isomerizable hydrocarbons for use in the process of this invention need not be concentrated. For example, isomerizable hydrocarbons appear in minor quantities in various refinery streams usually diluted with gases such as hydrogen, nitrogen, methane, ethane, propane, etc. These refinery streams containing minor quantities of isomerizable hydrocarbons are obtained in petroleum refineries and various refinery installations including thermal cracking units, catalytic cracking units, thermal reforming units, coking units, polymerization units, dehydrogenation units, etc. Such refinery offstreams have in the past been burned for fuel value since an economical process for the utilization of the hydrocarbon content has not been available. This is particularly true for refinery fluid streams known as off-gas streams containing minor quantities of isomerizable hydrocarbons. In addition, this process is capable of isomerizing aromatic streams such as reformate to produce xylenes, particularly paraxylene, thus upgrading the reformate from its gasoline value to a high petrochemical value.

As hereinbefore indicated, the catalyst utilized in the process of the present invention comprises a porous carrier material or support having combined therewith a platinum group component, a rhenium component, a tin component, and in the preferred case, a halogen component. Considering first the porous carrier material utilized in this catalyst, it is preferred that the material be a porous, absorptive, high-surface area support having a surface area of about 25 to about 500 m.$^2$/gm. The porous carrier material should be relatively refractory to the conditions utilized in the hydrocarbon isomerization process and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, Attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silicazirconia, etc.; (5) crystalline aluminosilicates such as naturally occurring or synthetically prepared mordenite and/or faujasite, either in the hydrogen form or in a form which has been treated with multivalent cations; and, (6) combinations of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- or eta-alumina giving best results. In addition, in some embodiments the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.30 to about 0.70 gm./cc. and surface area characteristics such that the average pore diameter is about 20 to 300 angstroms, the pore volume is about 0.10 to about 1.0 ml./gm. and the surface area is about 100 to about 500 m.$^2$/gm. In general, best results are typically obtained with a gamma-alumina carrier material which is used in the form of spherical particles having a relatively small diameter (i.e., typically about 1/16 inch), an apparent bulk density of about 0.5 gm./cc., a pore volume of about 0.4 ml./gm., and a surface area of about 175 m.$^2$/gm.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any deirsed size. For the purpose of the present invention a particularly preferred form of alumina is the sphere; and alumina spheres may be continuously manufactured by the well known oil drop method which comprises forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low tempreature of about 300° F. to about 400° F. and subjected to a calcination procedure at a temperature of about 850° F. to about 1300° F. for a period of about 1 to about 20 hours. This treatment effects conversion of the alumina hydrogel to the corrseponding crystalline gamma-alumina. See the teachings of U.S. Pat. No. 2,620,314 for additional details.

One essential constituent of the catalyst to be utilized in the process of the present invention is a tin component. This component may be present as an elemental metal or as a chemical compound such as the oxide, sulfide, halide, etc. Preferably, the tin component is used in an amount sufficient to result in the final catalytic composite containing, on an elemental basis, about 0.01 to about 5.0 wt. percent tin, with best results typically obtained with about 0.1 to about 1.0 wt. percent tin. This component may be incorporated in the catalytic composite in any suitable manner such as by coprecipitation or cogellation with the porous carrier material, ion exchange with the carrier material or impregnation of the carrier material at any stage in the preparation. It is to be noted that it is intended to include within the scope of the present invention all conventional methods for incorporating a metallic component in a catalytic composite and the particular method of incorporation used is not deemed to be an essential feature of the present invention. One preferred method of incorporating the tin component into the catalytic composite involves coprecipitating the tin component during the preparation of the preferred refractory oxide carrier material. In the preferred case, this involves the addition of suitable soluble tin compounds such as stannous or stannic halide to the alumina hydrosol and then combining the hydrosol with a suitable gelling agent and dropping the resulting mixture into an oil bath, etc., as explained in detail hereinbefore. Following the calcination step, there is obtained a carrier material comprising an intimate combination of alumina and stannic oxide. Another preferred method of incorporating the tin component into the catalyst composite involves the utilization of a soluble, decomposable compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and like compounds. The utilization of a tin chloride compound such as stannous or stannic chloride is particularly preferred since it facilitates the incorporation of both the tin component and at least a minor amount of the preferred halogen component in a single step. In general, the tin component can be impregnated either prior to, simultaneously with, or after the other metallic components are added to the carrier material. However, I have found that excellent results are obtained when the tin component is impregnated simultaneously with the other metallic components. In fact, a preferred impregnation solution contains chloroplatinic acid, perrhenic acid, hydrogen chloride, and stannous or stannic chloride. Following the impregnation step, the resulting composite is typically dried and calcined as explained hereinafter.

As indicated above, a second essential component of the subject catalyst to be utilized in the process of this invention is the platinum group component. Although the process of the present invention is specifically directed to the use of a catalytic composite containing platinum, it is intended to include other platinum group metals such as palladium, rhodium, ruthenium, osmium, and irridium, particularly palladium. The platinum group component, such as platinum, may exist within the final catalytic composite as a compound such as an oxide, sulfide, halide, etc., or in an elemental state. Generally, the amount of the platinum group component present in the final catalyst composite is small compared to the quantities of the other components combined therewith. In fact, the platinum group component generally comprises about 0.01 to about 1.0 wt. percent of the final catalytic composite, calculated on an elemental basis. Excellent results are obtained when the catalyst contains about 0.1 to about 0.8 wt. percent of the platinum group metal. The preferred platinum group component is platinum, palladium, or a compound of platinum or palladium.

The platinum group component may be incorporated in the catalytic composite in any suitable manner such as coprecipitation or cogellation with the preferred carrier material, ion exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloro-platinic acid. Other water-soluble compounds of platinum may be employed in impregnation solutions and include ammonium chloroplatinate, platinum chloride, dinitro diamino platinum, etc. The utilization of a platinum chloride compound, such as chloroplatinic acid, is preferred since it facilitates the incorporation of both the platinum component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases it may be advantageous to impregnate the carrier material when it is in a gelled state. Following the impregnation, the resulting impregnated support is dried and subjected to a high temperature calcination or oxidation technique which is explained hereinafter.

Yet another essential component of the catalyst to be utilized in the process of the present invention is the rhenium component. This component may be present as an elemental metal, as a chemical compound such as the oxide, sulfide, halide, etc., or as a physical or chemical combination with the porous carrier material and/or other components of the catalytic composite. The rhenium component is preferably utilized in an amount sufficient to result in a final catalytic composite containing about 0.01 to about 1 wt. percent rhenium, calculated on an elemental basis. The rhenium component may be incorporated in the catalytic composite in any suitable manner and at any stage in the preparation of the catalyst. It is generally advisable to incorporate the rhenium component in an impregnation step after the porous carrier material has been formed in order that the expensive metal will not be lost due to washing and purification treatments which may be applied to the carrier material during the course of its production. Although any suitable method for incorporating a catalytic component in a porous carrier material can be utilized to incorporate the rhenium component, the preferred procedure involves impregnation of the porous carrier material. The impregnation solution can, in general, be a solution of a suitable soluble, decomposable rhenium salt such as ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid. The porous carrier material can be impregnated with the rhenium component either prior to, simultaneously with, or after the other components mentioned herein are combined therewith. Best results are ordinarily achieved when the rhenium component is impregnated simultaneously with the platinum group component. In fact, excellent results have been obtained with a one step impregnation procedure utilizing as an impregnation solution, an aqueous solution of chlorplatinic acid, perrhenic acid, stannic chloride, and hydrochloric acid.

Although it is not essential, it is generally preferred to incorporate a halogen component into the catalytic composite utilized in the process of the present invention. Accordingly, a preferred embodiment of the present invention involves a catalytic composite comprising a combination of a platinum group metallic component, a tin component, a rhenium component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst. This combined halogen may be either fluorine, chlorine, iodine, bromine, or mixtures thereof. Of these, fluorine and, particularly, chlorine are preferred for the purposes of the process of the present invention. The halogen may be added to the carrier material in any suitable manner, either during preparation of the support or before or after the addition of the other components. For example, the halogen may be added, at any stage of the preparation of the carrier material or to the calcined carrier material, as an aqueous solution of an acid such as hydrogen fluoride, hydrogen chloride, hydrogen bromide, etc. The halogen component or a portion thereof, may be composited with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For use in an isomerization process the halogen will be typically combined with the carrier material in an amount sufficient to result in a final composite that contains about 0.1% to about 10.0% and preferably about 0.1 to about 5.0% by weight of halogen calculated on an elemental basis. In particular, about 0.2 to about 1.5 wt. percent chlorine and/or about 0.5 to about 3.5 wt. percent fluorine yield a very effective, stable isomerization catalyst. In addition, small amounts of chloride or fluoride may be continuously added to the catalyst to offset any halogen loss by commingling a halogen-containing compound such as $CCl_4$ with the hydrocarbon feed.

Regarding the preferred amounts of the various metallic components contained in the catalyst to be utilized in the process of this invention, I have found it to be a good practice to specify the amounts of the rhenium component and of the tin component as a function of the amount of the platinum group component. On this basis, the amount of the rhenium component is ordinarily selected so that the atomic ratio of the platinum group metal to rhenium contained in the composite is about 0.05:1 to about 2.75:1 with the preferred range being about 0.25:1 to about 2.0:1. Similarly, the amount of the tin component is ordinarily selected to produce a composite containing an atomic ratio of the platinum group metal to tin of about 0.1:1 to about 3:1 with the preferred range being about 0.5:1 to about 1.5:1.

Another significant parameter for this catalyst utilized in the process of this invention is the "total metals content" which is defined to be the sum of the platinum group component, the rhenium component, and the tin component, calculated on an elemental tin, rhenium, and platinum group metal basis. Good results are ordinarily obtained with the subject catalyst when this parameter is fixed at a value of about 0.03 to about 3.0 wt. percent with best results ordinarily achieved at a metals loading of about 0.15 to about 2.0 wt. percent.

Integrating the above discussion of each of the essential and preferred components of the catalytic composite, it is evident that a particularly preferred catalytic composite comprises a combination of a platinum component, a rhenium component, a tin component, and a halogen component with an alumina carrier material in amounts sufficient to result in the composite containing about 0.1 to about 1.5 wt. percent halogen, about 0.01 to about 1.0 wt. percent platinum, about 0.01 to about 1.0 wt. percent rhenium, and about 0.01 to about 5.0 wt. percent tin. Best results are typically obtained, in the case of the tin component, when the composite contains about 0.1 to about 1.0 wt. percent tin, and, in the case of the halogen component, when the halogen is chlorine, fluorine, or a compound of chlorine or fluorine, and the composite contains about 0.1 to about 5.0 wt. percent halogen. Accordingly, specific examples of especially preferred catalytic composites to be utilized in the process of this invention are as follows: (1) a catalytic composite comprising a combination of .5 wt. percent tin, .5 wt. percent rhenium, .75 wt. percent platinum, and about 0.1 to about 5.0 wt. percent halogen with an alumina carrier material; (2) a catalytic composite comprising a combination of .1 wt. percent tin, .1 wt. percent rhenium, .1 wt. percent platinum, and about 0.1 to about 5.0 wt. percent halogen with an alumina carrier material; (3) a catalytic composite comprising a combination of about .375 wt. percent tin, .375 wt. percent rhenium, .375 wt. percent platinum, and about 0.1 to about 5.0 wt. percent halogen with an alumina carrier material; (4) a catalytic composite comprising a combination of .12 wt. percent tin, .1 wt. percent rhenium, .2 wt. percent platinum, and about .1 to about 5.0 wt. percent halogen with an alumina carrier material; (5) a catalytic composite comprising a combination of 0.25 wt. percent tin, 0.25 wt. percent platinum, 0.25 wt. percent rhenium, and about 0.1 to about 5.0 wt. percent halogen with an alumina carrier material; and, (6) the catalytic composite comprising a combination of 0.2 wt. percent tin, 0.2 wt. percent rhenium, 0.2 wt. percent platinum, and about 0.1 to about 5.0 wt. percent halogen with an alumina carrier material. The amounts of the components reported in these examples are calculated on an elemental basis.

Regardless of the details of how the components of the catalyst are combined with the porous carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. For example, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.2 to about 1.5 wt. percent.

Although not essential, the resulting calcined catalytic composite can be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material contain chemically combined hydroxyl groups such as those contained in silica and any of the other aforementioned refractory inorganic oxides including the various crystalline aluminosilicates and clays. Particularly preferred is alumina.

The presence of chemically combined hydroxyl groups in the porous carrier material causes a reaction to occur between the Friedel-Crafts metal halide and the hydroxyl groups of the carrier. For example, aluminum chloride reacts with the hydroxyl groups of alumina to yield Al—O—$AlCl_2$ active centers which enhance the catalytic behavior of the original platinum-tin-alumina composite, particularly for isomerizing $C_4$–$C_9$ paraffins.

The Friedel-Crafts metal halide can be impregnated onto a calcined catalytic composite containing combined hydroxyl groups by the sublimation of the halide onto the tin-platinum composite under conditions such that the sublimed metal halide is combined with the hydroxyl groups of the composite. This reaction is accompanied by the elimination of from about 0.5 to about 2.0 moles of hydrogen chloride per mole of Friedel-Crafts metal halide reacted. For example, in the case of subliming aluminum chloride which sublimes at about 184° C., suitable impregnation temperatures range from about 190° C. to about 700° C., preferably from about 200° C. to about 600° C. The sublimation can be conducted at atmospheric pressure or under increased pressures and in the presence of diluents such as inert gases, hydrogen and/or light paraffinic hydrocarbons. The impregnation may be conducted batchwise but a preferred method is to pass sublimed $AlCl_3$ vapors in admixture with an inert gas such as hydrogen through a calcined catalyst bed. This method both continuously deposits the $AlCl_3$ and removes the evolved HCl.

The amount of metal halide combined with a tin-platinum composite may range from about 1% to about 100% of the original metal halide-free composite. The final composite has unreacted metal halide removed by treating the composite at a temperature above the sublimation temperature of the halide for a time sufficient to remove therefrom any unreacted metal halide. For $AlCl_3$, temperatures of about 400° C. to about 600° C. and times of from about 1 to about 48 hours are satisfactory.

Although it is not essential, it is preferred that the resultant calcined catalytic composite be subjected to a substantially water-free reduction step prior to its use in the conversion of hydrocarbons. This step is designed to insure a uniform and finely divided dispersion of the metallic component throughout the carrier material. Preferably, substantially pure and dry hydrogen (i.e., less than 20 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce the metallic components to their elemental state. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides; etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this presulfiding step under substantially water-free conditions.

According to the process of the present invention, a hydrocarbon charge stock preferably in admixture with hydrogen is contacted with a catalyst of the type hereinbefore described in a hydrocarbon isomerization zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed into an isomerization zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion. In addition, the reactants may be in the liquid phase, vapor phase, or a mixed liquid-vapor phase when they contact the catalyst, with best results obtained in the vapor phase.

The process of this invention, utilizing the catalyst hereinbefore set forth, for isomerizing isomerizable olefinic or saturated hydrocarbons is preferably effected in a continuous down-flow fixed bed system. One particular method is continuously passing the hydrocarbon preferably commingled with about 0.1 to about 10 moles or more of hydrogen per mole of hydrocarbon to an isomerization reaction zone containing the catalyst and maintaining the zone at proper isomerization condititons such as a temperature in the range of about 0° C. to about 425° C. or more and a pressure of about atmospheric to about 100 atmospheres or more. The hydrocarbon is passed over the catalyst at a liquid hourly space velocity (defined as volume of liquid hydrocarbon passed per hour per volume of catalyst) of from about 0.1 to about 10 hr.$^{-1}$ or more. In addition, diluents such as argon, nitrogen, etc., may be present. The isomerized product is continuously withdrawn, separated from the reactor effluent, and recovered by conventional means, preferably fractional distillation, while the unreacted starting material may be recycled to form a portion of the feed stock.

Likewise, the process of this invention for isomerizing an isomerizable alkylaromatic hydrocarbon is preferably effected by contacting the aromatic in a reaction zone containing the hereinbefore described catalyst with a fixed catalyst bed by passing the hydrocarbon in a down-flow fashion through the bed while maintaining the zone at proper alkylaromatic isomerization conditions such as a temperature in the range of from about 0° C. to about 600° C. or more and a pressure of atmospheric to about 100 atmospheres or more. The hydrocarbon is passed preferably in admixture with hydrogen at a hydrogen to hydrocarbon mole ratio of about 1:1 to about 25:1 or more at a liquid hourly hydrocarbon space velocity of about 0.1 to about 20 hr.$^{-1}$ or more. Other inert diluents such as nitrogen, argon, etc., may be present. The isomerized product is continuously withdrawn, separated from the reactor effluent by conventional means including fractional distillation or crystallization and recovered.

EXAMPLES

The following examples are given to illustrate the preparation of the catalytic composite to be utilized in the process of this invention and its use in the isomerization of isomerizable hydrocarbons. However, these examples are not presented for purposes of limiting the scope of the invention but in order to further illustrate the embodiments of the present process.

Example I

This example demonstrates one method of preparing the preferred catalytic composite to be used in the process of the present invention.

An alumina carrier material comprising $\frac{1}{16}$" alumina spheres was prepared by forming an alumina hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles, and finally drying and calcining the aged and washed particles to form spherical particles of gamma-alumina containing about 0.3 wt. percent combined chloride. Additional details as to this method of preparing the preferred carrier material are given in the teachings of U.S. Pat No. 2,620,314.

The resulting gamma-alumina particles were then contacted with an impregnation solution containing chloroplatinic acid, perrhenic acid, hydrogen chloride, and stannic chloride in amounts sufficient to yield a final composite containing 0.2 wt. percent platinum, 0.1 wt. percent rhenium, and 0.12 wt. percent tin, calculated on an elemental basis. The impregnated spheres were then dried at a temperature of about 300° F. for about an hour and thereafter calcined in an air atmosphere at a temperature of about 925° F. for about 1 hour. The resulting calcined spheres where then contacted with an air stream containing $H_2O$ and HCl in a mole ratio of about 40:1 for about 4 hours at 975° F.

The resulting particles of the catalytic composite were analyzed and found to contain, on an elemental basis, about 0.1 wt. percent rhenium, about 0.12 wt. percent tin, about 0.2 wt. percent platinum, and about 0.85 wt. percent chloride.

Example II

A portion of the catalyst prepared in Example I is placed, as a catalytic composite, in a continuous flow fixed-bed isomerization plant of conventional design. The charge stock, containing on a wt. percent basis, 20.0% ethylbenzene, 10.0% para-xylene, 50.0% meta-xylene, and 20.0% ortho-xylene is commingled with about 10 moles of hydrogen per mole of hydrocarbon, heated to 410° C., and continuously charged at 3.5 hr.$^{-1}$ liquid hourly space velocity (LHSV) to the reactor which is maintained at a pressure of about 500 p.s.i.g. and 410° C. The resulting product evidences essentially equilibrium conversion to para-xylene with only insignificant amounts of cracked products thus indicating an efficient alkylaromatic isomerization catalyst.

Example III

A portion of the catalyst produced by the method of Example I is placed in a continuous flow, fixed-bed isomerization plant of conventional design. Substantially pure meta-xylene is used as a charge stock. The charge stock is commingled with about 10 moles of hydrogen per mole of hydrocarbon, heated to about 380° C., and continuously charged to the reactor which is maintained at a pressure of about 350 p.s.i.g. Substantial conversion of meta-xylene to para-xylene is obtained . . . i.e., greater than 80% of equilibrium.

Example IV

A catalyst identical to that produced in Example I but containing only 0.40 wt. percent combined chloride is used to isomerize 1-butene in an appropriate isomerization reactor, at a reactor pressure of about 500 p.s.i.g. and a reactor temperature of about 130° C. Substantial conversion to 2-butene is observed.

Example V

The same catalyst as utilized in Example IV is charged to an appropriate, continuous isomerization reactor of conventional design maintained at a reactor pressure of about 1000 p.s.i.g. and a reactor temperature of about 170° C. 3-methyl-1-butene is continuously passed to this reactor with substantial conversion to 2-methyl-2-butene being observed.

Example VI

A catalyst, identical to that catalyst produced in Example I except that the gamma-alumina particles are contacted with hydrogen fluoride to provide a 2.9 wt. percent combined fluoride content in the catalyst, is placed in an appropriate continuous isomerization reactor of conventional design maintained at a reactor pressure of about 350 p.s.i.g. and a reactor temperature of about 210° C. Normal hexane is continuously charged to the reactor and an analysis of the product stream shows substantial conversion to 2,2-dimethylbutane, 2,3-dimethylbutane, 2-methylpentane, and 3-methylpentane.

Example VII 200 grams of the reduced platinum-tin-rhenium-alumina composite of Example I are placed in a glass-lined rotating autoclave along with 150 grams of anhydrous aluminum chloride. The autoclave is sealed, pressured with 25 p.s.i.g. of hydrogen and heated and rotated for 2 hours at 300° C. The autoclave is then allowed to cool, depressured through a caustic scrubber, opened and the final composite removed therefrom. An analysis of this composite indicates a 15 wt. percent gain based on the original composite, equivalent to the aluminum chloride sublimed and reacted thereon. The caustic scrubber is found to have absorbed hydrogen chloride equivalent to about 5.0 wt. percent of the original composite corresponding to about 0.8 mole of HCl evolved per mole of aluminum chloride adsorbed.

Example VIII

A portion of the catalyst prepared in Example VII is placed in an appropriate continuous isomerization apparatus and used to isomerize normal butane at a reactor pressure of 315 p.s.i.g., a 0.5 hydrogen to hydrocarbon mole ratio, a 1.0 liquid hourly space velocity, and a reactor temperature of 240° C. Substantial conversion of normal butane to isobutane is observed . . . i.e., approximately a conversion of normal butane to isobutane of about 45 wt. percent of the original butane charged.

Example IX

A portion of the catalyst as prepared in Example I is placed in an appropriate continuous isomerization reactor maintained at a reactor temperature of about 200° C. and a reactor pressure of about 250 p.s.i.g. Methylcyclopentane is continuously passed to this reactor with a substantial conversion to cyclohexane being observed.

I claim as my invention:

1. A catalytic composite which comprises a refractory inorganic oxide having combined therewith a platinum group component, a rhenium component, a tin component, and a Friedel-Crafts metal halide component.

2. The composite of claim 1 further characterized in that said composite contains, on a Friedel-Crafts metal halide-free basis, about 0.01 to about 1.0 wt. percent platinum group metal, about 0.01 to about 1.0 wt. percent rhenium and about 0.01 to about 5.0 wt. percent tin, calculated on an elemental basis and about 1.0 to about 100 wt. percent Friedel-Crafts metal halide.

3. The composite of claim 2 further characterized in that said platinum group metal is platinum, palladium, or a compound of platinum or palladium.

4. The composite of claim 1 further characterized in that said metal halide is anhydrous aluminum chloride.

5. The composite of claim 1 wherein a sulfur component is combined therewith in an amount based on elemental sulfur of about 0.05 to about 0.5 wt. percent of the metal halide-free composite.

References Cited

UNITED STATES PATENTS

| 3,165,479 | 1/1965 | Burk et al. | 252—466X |
| 3,326,961 | 6/1967 | Eden et al. | 252—439X |
| 3,389,965 | 6/1968 | Ruiter et al. | 252—439X |
| 3,449,078 | 6/1969 | Quik et al. | 252—466X |
| 3,449,237 | 6/1969 | Jacobson et al. | 252—466X |

CURTIS R. DAVIS, Primary Examiner

U.S. Cl. X.R.

252—442, 460, 466; 260—666, 668, 683.2, 683.68